(12) United States Patent
Hayabuchi et al.

(10) Patent No.: US 6,729,206 B2
(45) Date of Patent: May 4, 2004

(54) AUTOMATIC TRANSMISSION CASE

(75) Inventors: Masahiro Hayabuchi, Anjo (JP); Masaaki Nishida, Anjo (JP); Satoru Kasuya, Anjo (JP); Nobukazu Ike, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/858,491

(22) Filed: May 17, 2001

(65) Prior Publication Data
US 2002/0017159 A1 Feb. 14, 2002

(30) Foreign Application Priority Data
Aug. 11, 2000 (JP) ......................... 2000-244066

(51) Int. Cl.⁷ ........................... F16H 57/02; F16H 57/04
(52) U.S. Cl. ..................................... 74/606 R; 74/467
(58) Field of Search ............................... 74/606 R, 467

(56) References Cited

U.S. PATENT DOCUMENTS

| 3,942,502 A | * | 3/1976 | Gorres et al. ............. 123/195 R |
| 4,226,200 A | * | 10/1980 | Morisawa et al. ......... 74/606 R |
| 4,467,754 A | * | 8/1984 | Hayashi et al. ............ 74/606 R |
| 4,890,512 A | * | 1/1990 | Kano et al. ..................... 74/740 |
| 5,176,039 A | * | 1/1993 | Takeuchi et al. .............. 74/467 |
| D377,657 S | * | 1/1997 | Winters ...................... D15/149 |
| 5,644,954 A | * | 7/1997 | Matsufuji ................. 74/606 R |
| 5,657,672 A | * | 8/1997 | Mochizuki et al. ....... 74/606 R |
| 2001/0011616 A1 | * | 8/2001 | Kageyama et al. ......... 184/6.12 |
| 2002/0043128 A1 | * | 4/2002 | Cooper ..................... 74/606 R |

FOREIGN PATENT DOCUMENTS

| JP | 61-6459 | * | 1/1986 | ............... 74/606 R |
| JP | 2-66150 | * | 10/1990 | ............... 74/606 R |
| JP | 6-221408 | * | 8/1994 | ............... 74/606 R |
| JP | HEI 7-259967 | | 10/1995 | |

* cited by examiner

Primary Examiner—Vinh T. Luong
(74) Attorney, Agent, or Firm—Oliff & Berridge, PLC

(57) ABSTRACT

The level of quietness for an automatic transmission case is ensured by preventing vibration by improving the rigidity while suppressing the increase in the mass of a transmission case. In an automatic transmission case in which a valve body is attached to a case wall that covers the transmission mechanism, the rigidity of the automatic transmission case is increased by providing, in the case, an enclosing wall that projects out from the case wall and encloses the periphery of the valve body.

16 Claims, 4 Drawing Sheets

AUTOMATIC TRANSMISSION CASE

BACKGROUND OF THE INVENTION

1. Field of Invention

The invention relates to a case for an automatic transmission and, in particular, to a vibration resistant structure thereof.

2. Description of Related Art

A case for an automatic transmission is generally formed from a transmission casing that covers the transmission mechanism, a transmission apparatus housing that is fastened to the front of the casing and that covers a hydraulic power transmission apparatus comprising a torque converter or the like, and an extension housing that is mounted to the rear of the transmission casing. The valve body of the hydraulic control apparatus that controls the hydraulic power transmission apparatus and the transmission mechanism of the automatic transmission is usually mounted on the side of the transmission casing. In an automatic transmission for a front engine—rear drive (FR) vehicle, in particular, the valve body is normally fixed to the bottom of the transmission casing and protrudes downwards from the casing. The valve body is completely enclosed by an oil pan that covers the area below and surrounding the valve body. A representative example of an automatic transmission case having this type of structure is disclosed in Japanese Patent Laid-Open No. HEI 7-259967.

Because the size of the outer diameter is severely restricted in an automatic transmission for an FR vehicle in order to ensure sufficient space in the vehicle interior, as is not the case with an automatic transmission for a front engine front drive (FF) vehicle, an automatic transmission for an FR vehicle has a narrow elongated shape in which the size of the outer diameter is small in comparison with the size in the axial direction due to each element used to change gears being aligned in the axial direction. Therefore, it is difficult to secure rigidity in the automatic transmission and when this is mounted in a vehicle and is regarded together with the engine as a vibration system, if the rigidity of this vibration system is low, the vibration system has a resonance point in a comparatively low frequency range near the vibration frequency of the propeller shaft. Accordingly, if this resonance frequency is a frequency that causes a harsh grating sound to be heard in the audible frequency band, then it is not possible to achieve the level of quietness expected in a running vehicle.

In order to reduce the noise generated from the transmission due to the resonance and ensure an appropriate level of quietness, it is necessary to eliminate the resonance and vibration of the propeller shaft by providing the transmission with a characteristic vibration frequency in a higher frequency region. To achieve this, it is necessary to increase the rigidity. In particular, when a drive apparatus for a four wheel drive vehicle is formed using an automatic transmission for an FR vehicle as the base thereof, in terms of mass, because a transfer having only a slightly smaller mass than the transmission is linked to the rear side of the transmission, it is easy for a vibration system having a long axial length and having a low rigidity joint to be formed between the two large mass portions that are linked to each other. Thus, it is difficult to reduce the noise further without increasing the rigidity of the transmission case to which the transfer is linked.

Making the case thicker is one simple means of improving the rigidity of a transmission. However, if the case is made thicker, the mass of the case itself is also thereby increased resulting instead in a vibration system with a linking portion having a relatively low rigidity being formed and the desired effect of an improvement in the level of quietness is not obtained.

Therefore, it is the main aim of the invention to provide a transmission case capable of providing increased rigidity while holding the increase in the mass of the transmission to the absolute minimum in order to ensure that the transmission operates quietly.

SUMMARY OF THE INVENTION

Accordingly, it is an object of the invention to provide an automatic transmission case in which a valve body is attached to a case wall covering a transmission mechanism, wherein an enclosing wall that projects outwards from the case wall enclosing the periphery of the valve body is provided in the case.

It is effective if the enclosing wall in the above structure is formed higher than the thickness of the valve body, and the opening of the space for containing the valve body that is enclosed by the enclosing wall is covered by an oil pan that is shallower than the thickness of the valve body.

Moreover, in a structure in which the case comprises a transmission casing that covers the transmission mechanism and a transmission apparatus housing that covers a hydraulic power transmission apparatus, it is also effective if the transmission apparatus housing has a joining portion where it is joined to the transmission casing, the enclosing wall is provided in the transmission casing, and the front portion of the enclosing wall forms a matching portion that matches the joining portion of the transmission apparatus housing; and the transmission apparatus housing is mounted to the transmission casing by matching the joining portion to the front portion of the enclosing wall and fastening the joining portion to the front portion of the enclosing wall using fastening means.

In this case, it is effective if the joining portion is formed as a joining wall that faces the front portion of the enclosing wall of the transmission casing, and the joining wall is provided with ribs that connect the rear of the joining wall to the transmission apparatus housing.

Furthermore, it is effective if the valve body is fastened by fastening means to the case wall in the vicinity of the front portion and the rear portion of the enclosing wall.

Moreover, it is also effective if the rear wall is provided in the case wall in the vicinity of a supporting portion that supports an output shaft of the transmission mechanism.

Furthermore, it is also effective if the rear wall is provided with ribs that connect the rear of the rear wall with the rear end portion of the transmission casing.

Moreover, it is also effective if the case comprises a transmission casing that covers the transmission mechanism and a transmission apparatus housing that covers a hydraulic power transmission apparatus, and a rib is provided extending from the front end to the rear end of the transmission casing that is integral with a portion of the case wall other than the portion of the transmission casing where the valve body is mounted.

According to an aspect of the invention, because the space needed for attaching the valve body is used to enable a case structure to be formed in which the geometrical moment of inertia of the casing is enlarged by forming the enclosing wall that encloses the periphery of the valve body attached to the transmission case projecting out from the transmission case, the rigidity of the case is improved while holding any increase in the mass to a minimum, without causing any increase in the mass to be generated as a result of increasing the thickness of the case wall itself in order to improve the rigidity.

In a preferred form of the invention, because the space to contain the valve body can be secured using the shallow oil pan that covers the opening of the containing space and using the enclosing wall that is higher than the thickness of the valve body, there is no need to lower the position of the oil pan because the enclosing wall has been made to project out in order to ensure sufficient rigidity, and the minimum ground clearance when the automatic transmission is mounted in a vehicle can be secured in the same way as in a conventional structure.

In a preferred form of the invention, when the transmission case is formed from a transmission casing that covers the transmission mechanism and a transmission apparatus housing that covers a hydraulic power transmission apparatus in the same way as in a conventional structure, because the transmission casing and the power transmission housing are linked directly by the matching portion formed by the front portion of the enclosing wall on the casing side and the joining portion of the housing, any reduction in the rigidity of the linking portion due to a separate transmission casing being linked to a power transmission housing is controlled.

In a preferred form of the invention, ribs at the rear of the joining wall of the transmission apparatus housing fastened to the front portion of the enclosing wall of the transmission casing have the function of improving the rigidity of the transmission apparatus housing and, as a result, the rigidity of the entire transmission case including the rigidity of the transmission casing linked to the transmission apparatus housing is improved.

In a preferred form of the invention, because the valve body is fastened by fastening means to the case wall in the vicinity of the front portion and the rear portion of the enclosing wall that encloses the valve body, the rigidity of the valve body, which conventionally has had a high degree of rigidity, can be used to improve the rigidity of the transmission casing.

In a preferred form of the invention, by providing the rear wall of the enclosing wall in the vicinity of the case wall supporting the output shaft, the enclosing wall also helps to improve the rigidity of the output shaft supporting portion of the case wall and the rigidity of the output shaft support is also improved In a preferred form of the invention, because it is possible to improve the rigidity of the rear portion of the casing using the rigidity of the enclosing wall, the result is that the rigidity of the transmission casing can be improved even further.

In a preferred form of the invention, it is possible to improve the rigidity of the overall transmission casing by providing a balanced rigidity in response to the improved rigidity of the portion to which the valve body is attached.

BRIEF DESCRIPTION OF THE DRAWINGS

The invention will be described with reference to the drawings, in which.

DETAILED DESCRIPTION OF PREFERRED EMBODIMENTS

Figure 1:
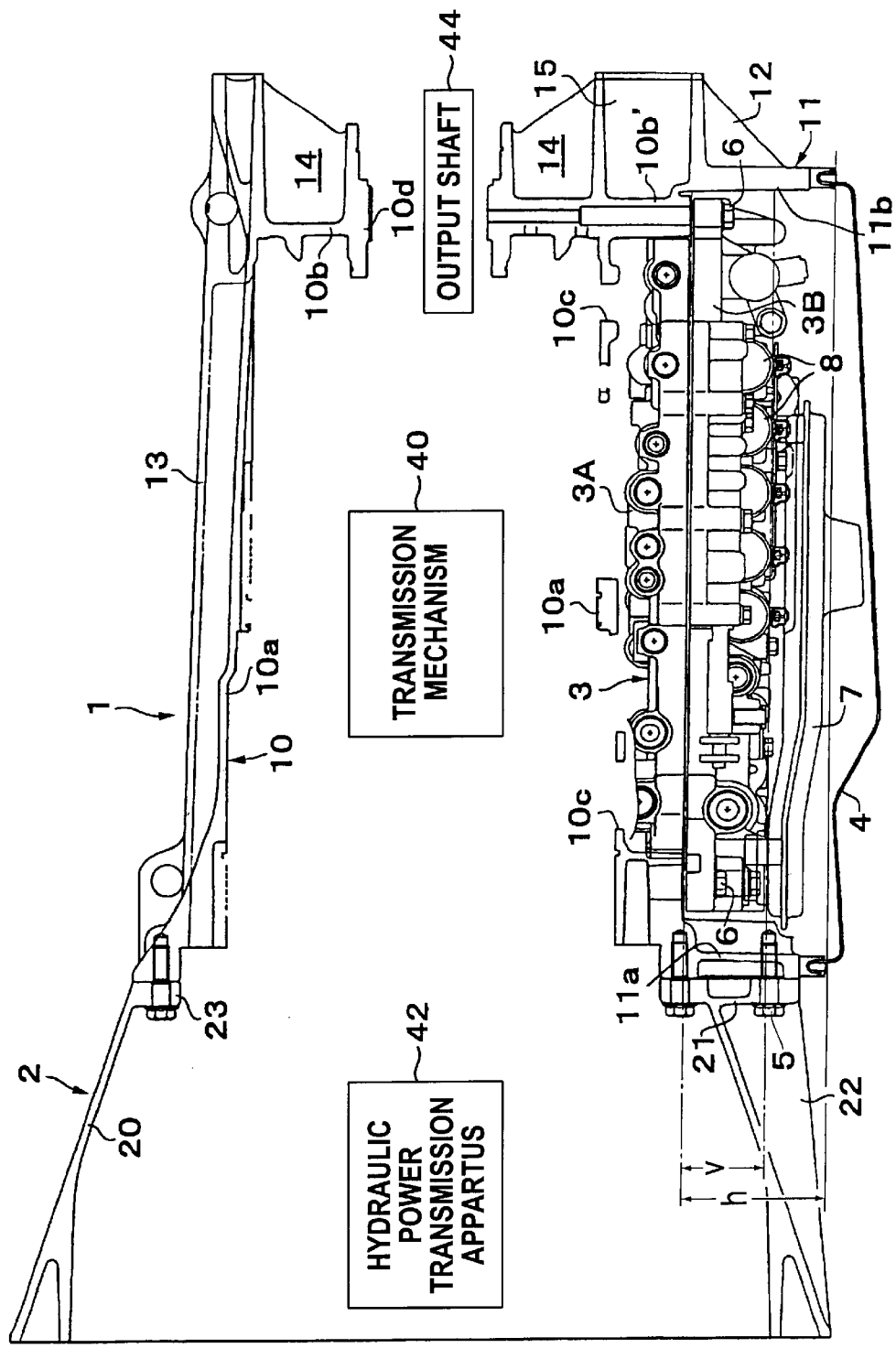
FIG. 1 is a cross-sectional view in the axial direction of the automatic transmission case according to an embodiment of the invention.

Hereinafter, an embodiment of the invention will be described with reference to the drawings. FIG. 1 is a cross-sectional view in the axial direction of the transmission case according to an embodiment of the invention. As shown in FIG. 1, the transmission case comprises a transmission casing (in the description given of the embodiment, this will be referred to as the casing) 1 that covers a transmission mechanism 40; and a converter housing 2 (referred to below as the housing) serving as a power transmission apparatus housing that covers a hydraulic power transmission apparatus 42 comprising a torque converter, or the like. Details of the transmission mechanism 40 and the hydraulic power transmission apparatus 42 are omitted, they are identified by boxes, as they do not form part of the invention rather they form the environment for the invention, i.e., they are what are contained in the casing 1 and the converter housing 2. The valve body 3 that is attached to the case wall of the transmission case, in this embodiment, is attached to the bottom portion of the case wall 10 that is formed by the wall of the casing 1.

Figure 2:
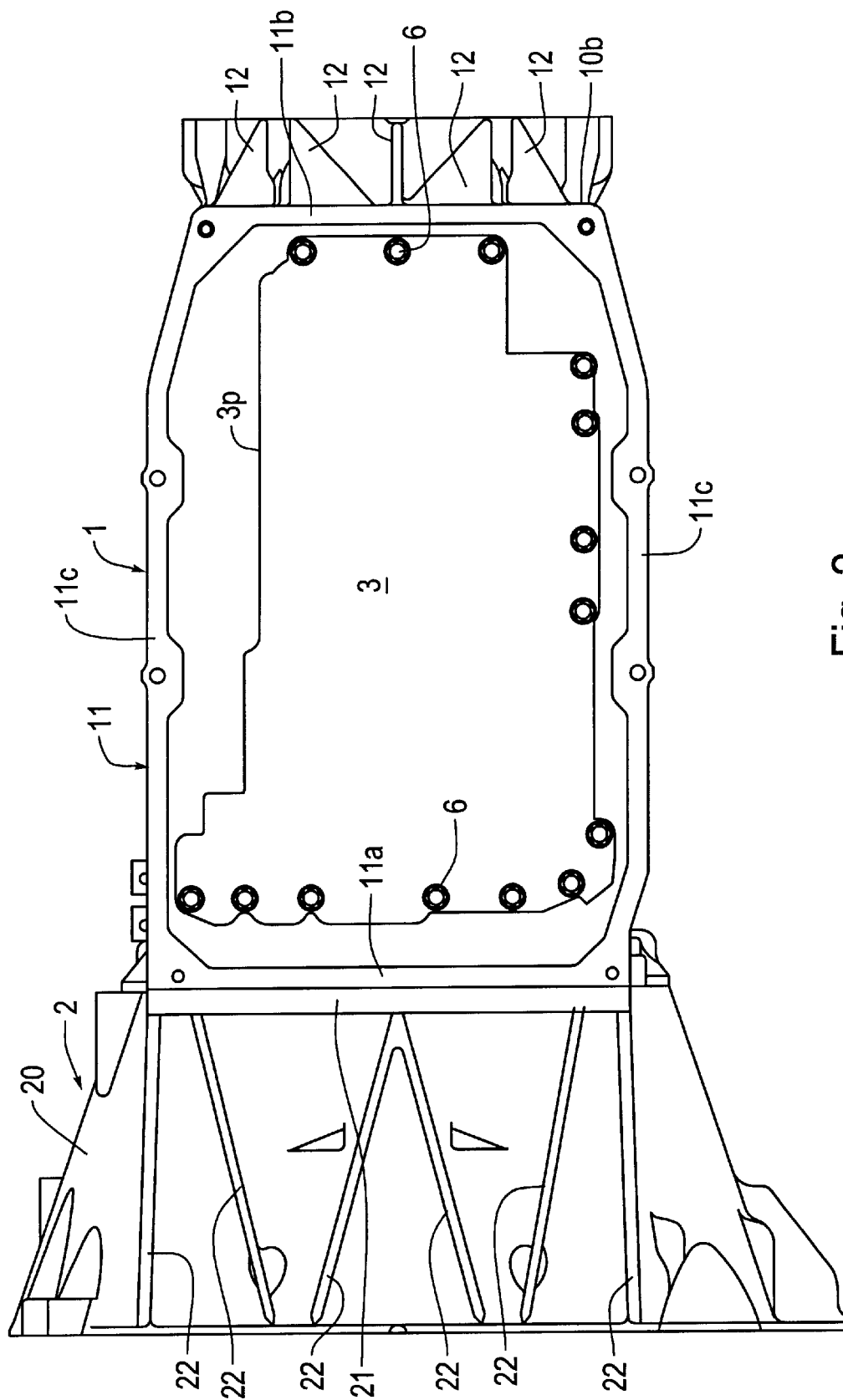
FIG. 2 is a bottom view showing the structure of the automatic transmission case, before the oil pan has been attached thereto.

In accordance with the characteristics of the invention, an enclosing wall 11, that projects out from the case wall 10 enclosing the periphery of the valve body 3, is provided in the casing 1 (FIG. 2). The enclosing wall 11 projects, or extends, beyond the thickness of the valve body 3. The opening of the space containing the valve body 3, that is enclosed by the enclosing wall 11 having a height h, is covered by an oil pan 4 that is shallower than the thickness of the valve body 3. Note that, in the invention, when the thickness of the valve body 3 is referred to, what is meant is the thickness v of the portion of the valve body 3 that is contained within the valve body containing space enclosed by the enclosing wall 11, that is, the valve lower body 3B of the valve body 3. By forming the enclosing wall 11, that encloses the periphery 3p of the valve body 3 attached to the casing 1, and projects out from the casing 1, the space needed for attaching the valve body 3 is used to enable a case structure to be formed which permits the geometrical moment of inertia of the casing 1 to be enlarged. In this structure, the rigidity of the casing 1 is improved while limiting any increase in the mass to a minimum, thereby not increasing the mass which would result from increasing the thickness of the case wall 10 itself in order to improve the rigidity. Moreover, by securing the space that contains the valve body 3 using the shallow oil pan 4, that covers the opening of the valve body containing space, and the enclosing wall 11, which is higher than the thickness of the valve body 3, there is no need to lower the position of the oil pan because the enclosing wall 11 projects out to ensure sufficient rigidity. Also, the minimum ground clearance when the automatic transmission is mounted in a vehicle can be secured in the same way as in a conventional structure.

The housing 2 is provided with a portion where it is joined to the casing 1. The front portion 11a of the enclosing wall 11 provided in the casing 1 forms a matching portion that matches the joining wall 21 of the housing 2. The housing 2 is attached to the casing 1 by fastening the joining wall 21 to the front portion 11a of the enclosing wall 11 using fastening means 5 formed from bolts. By employing this type of structure, the casing 1 and the housing 2 are linked directly by the matching portion formed by the front wall 11a of the enclosing wall 11 on the casing side and the joining wall 21 of the housing 2. Therefore, any reduction in the rigidity of the linking portion due to a separate casing 1 and housing 2 being linked is controlled.

Furthermore, the joining wall 21 of the housing 2 is formed as a joining wall facing the front wall 11a of the enclosing wall 11 of the casing 1 and the joining wall 21 is also provided at the front side thereof (FIGS. 1 and 2) with joining ribs 22 that are connected to the housing 2. By employing this structure, the joining ribs 22, at the front of the joining wall 21 of the housing 2 fastened to the front portion 11a of the enclosing wall 11 of the casing 1, have the function of improving the rigidity of the housing 2. As a result, the rigidity of the entire transmission case, including the rigidity of the casing 1 linked to the housing 2, is also improved.

As is shown in FIG. 2, viewing the bottom of the transmission case when the oil pan is removed, the valve body 3 is fastened by fastening means 6, formed from bolts, to the case wall 10 in the vicinity of the front wall 11a and the rear wall 11b of the enclosing wall 11. By employing this structure, the rigidity of the valve body 3, which has always had a high degree of rigidity, is used to improve the rigidity of the casing 1.

The rear wall 11b is provided in the vicinity of a supporting portion, or wall, 10b (FIG. 4) for an output shaft 44 of the transmission mechanism in the case wall 10. Again, the output shaft 44 is represented by a box in FIG. 1 as it does not form a part of the invention. The rear end of the rear wall 11b is also provided with rear connection ribs 12 that connect the rear end of the casing 1 with the rear wall 11b. By providing the rear wall 11b of the enclosing wall 11 in the vicinity of the case wall supporting the output shaft in this way, the enclosing wall 11 also helps to improve the rigidity of the output shaft supporting portion of the case wall 10 and the rigidity of the output shaft support is also improved. Moreover, because it is possible to improve the rigidity of the rear portion of the casing 1 using the rigidity of the enclosing wall 11 which is reinforced by the rear connection ribs 12, the result is that the rigidity of the casing 1 is improved even further.

The casing 1 is provided with a single longitudinal rib 13 extending from the front end of the casing 1 to the rear end thereof in a case wall portion, or peripheral wall, 10a that is different from the bottom portion where the valve body 3 is provided. This structure is intended to improve the rigidity of the overall casing by providing a balanced rigidity in response to the improved rigidity of the portion to which the valve body 3 is attached.

Figure 3:
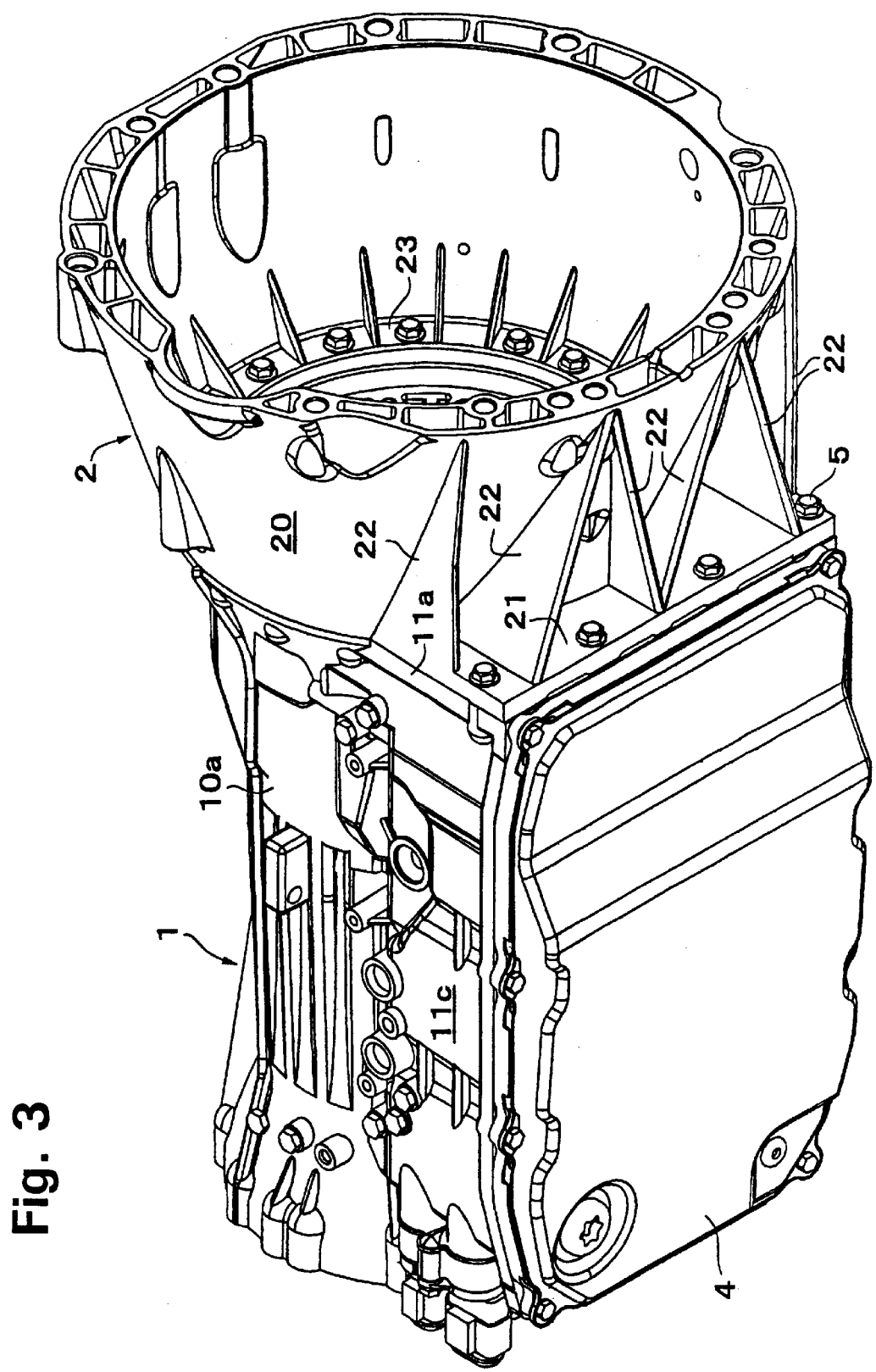
FIG. 3 is a perspective view of the entire automatic transmission case as seen from the bottom front.

More specifically, it can be seen by referring to the perspective view in FIG. 3 of the transmission case as seen from the bottom front thereof, that the casing 1 is formed from a case wall 10 provided with a peripheral wall 10a that overall is formed substantially in a cylindrical shape, and a wall 10b (FIGS. 1 and 4) in the diametrical direction that shuts off the rear portion of the peripheral wall 10a leaving only an opening for the output shaft 44 to pass through. The rear end of the peripheral wall 10a is formed with a substantial thickness having an outer diameter that is larger at the outer side in the diametrical direction than the inner diameter of the peripheral wall that essentially delineates the inner diameter of the casing 1. Inside the peripheral wall 10a are formed a plurality of fluid passages that communicate with fluid passages of an oil pump body (not shown) mounted on the peripheral wall 10a and a shaft that is inserted therein and supported thereby. The thick portion of the rear end of the peripheral wall 10a and the extended portion 10b' on the bottom side of the wall 10b in the diametrical direction of the rear portion together with the side walls that connect both ends of each in the axial direction form a mounting frame for the valve body 3 below the peripheral wall 10a to form a recess for receiving the valve upper body 3A of the valve body 3 having a rectangular shape when seen in plan view. The bottom face of this mounting frame forms a joining surface with the valve body 3. Accordingly, from this positional relationship, the front wall 11a and the rear wall 11b extend from the joining surface of the valve body 3 and both side walls 11c form walls that extend downwards from the peripheral walls 10 that form the outer diameter portion of the case. Note that the bottom ends of both side walls 11c are formed having projecting portions of flanges, that protrude in a transverse direction, as is shown in FIG. 3. These projecting portions are structured so as to serve both as a fastening portion for the mounting bolts of the oil pan 4 and as reinforcement for the enclosing wall 11. Moreover, a plurality of openings 10c used for draining lubricating oil are formed in the portion of the peripheral wall 10a positioned within the mounting frame in order to return to the oil pan 4 lubricating oil supplied to each portion of the transmission mechanism from the space enclosed by the peripheral wall of the casing 1.

Figure 4:
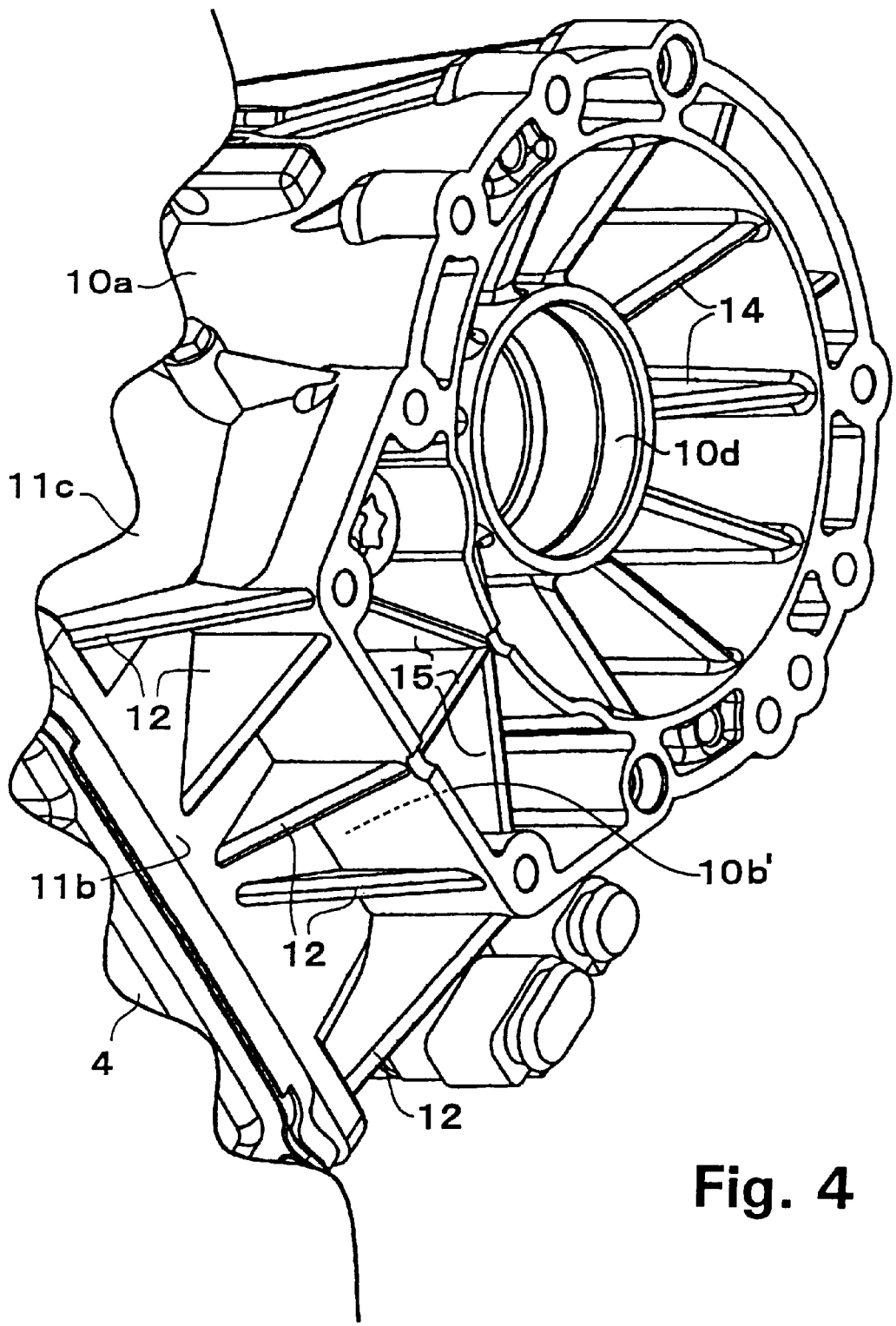
FIG. 4 is a perspective view of a portion of the automatic transmission case as seen from the bottom rear.

As is shown in FIG. 4 by the view of the rear portion of the casing as seen from the bottom rear, thereof in this embodiment, the rear portion of the case is formed with an adaptor structure in order that it may be linked to the transfer of a four wheel drive vehicle. Because the rigidity of this portion also needs to be improved, the portion between the double wall structure peripheral wall 10a and a cylindrical boss portion 10d, that surrounds the opening in the wall 10b in the diametrical direction and supports a bearing that extends in the axial direction, is reinforced with a plurality of reinforcing ribs 14 radiating outwards. Furthermore, the interior of the space having a trapezoidal cross section that corresponds to the rear portion of the downward extended portion 10b' of the diametrical wall 10b is also reinforced by a rib 15 that runs in the vertical direction and by ribs 15 that run in a diagonal direction. The ribs 15 forming a second plurality of reinforcing ribs.

The housing 2 is formed from a peripheral wall 20 that is open at both the front and rear and is shaped overall like a truncated cylinder. The front side thereof, which is linked to the engine, has a double wall structure (FIGS. 1 and 3), while the rear side, which is linked to the casing 1, is formed with a wall 23 that serves as a flange used for fastening that projects slightly radially inward. The radially inwardly projecting wall 23 is formed as an end surface that almost exactly matches shape of the opening of the casing 1. The joining wall 21 is formed as a wall that extends downwards from the radially inwardly projecting wall 23 and the rigidity of the joining wall 21 is reinforced by six joining ribs 22 that extend from the rear of the joining wall 21 to the front end of the peripheral wall 20. While the inner ribs have essentially the same height as the height of the joining wall 21 where they are joined to the rear of the joining wall 21, the joining ribs 22 at both sides are formed slightly narrower, i.e., having a lesser height, at the end joined to the rear of the joining wall 21. This is to facilitate the job of fastening the side bolts 5 at both sides.

Next, the valve body 3 is formed from a valve upper body 3A and a valve lower body 3B that are formed from die cast material, and a separator that is sandwiched between these two parts. The valve lower body 3B is formed larger than the valve upper body 3A as seen in side view (FIG. 1) and is provided with a fastening portion by which it is fastened to the mounting frame of the casing 1. As is shown in FIG. 2, the valve body 3 is fastened to the case wall 10 by six front bolts 6 and three rear bolts 6 in the vicinity of the front wall 11a and the rear wall 11b respectively of the enclosing wall 11 in such a way that the valve upper body 3A of the valve body 3 is contained inside the mounting frame of the casing 1, and the periphery 3p of the valve lower body 3B is surrounded, or enclosed, by the enclosing wall 11. Note that, as shown in FIG. 1, a strainer 7 and solenoids 8 are fitted to the valve lower body 3B.

As described above, because the valve body 3 is completely contained inside the enclosing wall 11, the oil pan 4 covering the opening of the enclosing wall 11 is formed in a shallow dish shape with only the portion that corresponds to the bottom of the intake opening of the strainers 7 fitted to the valve body 3 projecting slightly below the bottommost portion of the enclosing wall 11, in other words, in a shallow dish shape whose bottommost portion protrudes slightly lower than the portion thereof that is placed against the enclosing wall 11 with the seal inserted between the two. By employing this type of structure, it is possible to secure the space for containing the valve body 3 using the shallow oil pan 4 that covers the opening of the containing space and the enclosing wall 11 that is higher than the thickness of the valve body 3 that extends outside the casing, namely, in the embodiment, that is higher h than the thickness v of the valve body lower 3B. As a result, there is no need to lower the position of the oil pan 4 because the enclosing wall 11 has been made to project downwards to secure the required rigidity, and the minimum ground clearance when the automatic transmission is mounted in a vehicle can be secured in the same way as in a conventional structure.

The casing 1 and the housing 2 that are structured as has been described above are integrally joined together by bolts that are screwed into threaded holes formed in the thick portion of the front end of the peripheral wall 10a of the casing 1 via through holes formed in the radially inwardly projecting wall 23 of the housing 2. The joint between the casing 1 and the housing 2 is reinforced further by bolts 5 being screwed from the joining wall 21 side into the front wall 11a of the enclosing wall 11. The valve body 3 is fixed to the casing 1 using the bottom surface of the mounting frame of the case wall 10 as joining surfaces in the vicinity of the rear wall 11b and the front wall 11a of the enclosing wall 11. An integrated transmission case is thus formed by the rigid integration of the casing 1 and housing 2, whose rigidities have both been reinforced in the manner described above, through the reinforced structural portions thereof being joined together, and by further reinforcing the casing 1 and housing 2 using the rigidity of the valve body 3.

A detailed description of the invention has been given above based on one embodiment thereof, however, the invention is not limited to the described embodiment, and may be implemented in various configurations within the range described in the claims. In particular, in the described embodiment, the case rear end portion is formed integrally with an adaptor structure for linking with a transfer for a four-wheel drive vehicle, however, when constructing a normal transmission case for an FR vehicle, it is possible, instead of the adaptor structure, to fasten to the case an extension housing in the form of an extremely short cover.

What is claimed is:

1. An automatic transmission case in which a valve body is attached to a case wall covering a transmission mechanism and a hydraulic power transmission apparatus, including an enclosing wall that projects outwards from the case wall, to surround an outer periphery of the valve body, is provided in the case and the enclosing wall is formed with a height h greater than the thickness v of the valve body, the opening of the space for containing the valve body that is enclosed by the enclosing wall is covered by an oil pan that is shallower than the thickness v of the valve body.

2. The automatic transmission case according to claim 1, wherein the case comprises a transmission casing that covers the transmission mechanism and a transmission apparatus housing that covers the hydraulic power transmission apparatus, the transmission apparatus housing has a joining portion where the transmission apparatus housing is joined to the transmission casing, the enclosing wall is provided in the transmission casing, and the front portion of the enclosing wall forms a matching portion that matches the joining portion of the transmission apparatus housing, and the transmission apparatus housing is mounted to the transmission casing by matching the joining portion to the front portion of the enclosing wall and fastening the joining portion to the front portion of the enclosing wall using fastening means.

3. The automatic transmission case according to claim 2, wherein the joining portion is formed as a joining wall that faces the front portion of the enclosing wall of the transmission casing, and the joining wall is provided with joining ribs that connect the rear of the joining wall to the transmission apparatus housing.

4. The automatic transmission case according to claim 1, wherein the valve body is fastened by fastening means to the case wall adjacent the front portion and rear portion of the enclosing wall.

5. The automatic transmission case according to claim 4, wherein a rear wall is provided in the case wall proximate a supporting portion that supports an output shaft of the transmission mechanism.

6. The automatic transmission case according to claim 3, wherein the rear wall is provided with rear connection ribs that connect the rear of the rear wall with the rear end portion of the transmission casing.

7. The automatic transmission case according to claim 1, wherein the case comprises a transmission casing that covers the transmission mechanism and a transmission apparatus housing that covers the hydraulic power transmission apparatus, and a longitudinal rib is provided extending from the front end to the rear end of the transmission casing that is integral with a portion of the case wall other than the portion of the transmission casing where the valve body is mounted.

8. An automatic transmission case mounting a valve body having an upper valve body and a lower valve body, comprising:
   a transmission casing having a valve body containing space;
   an enclosing wall extending outwardly from the transmission casing and surrounding the valve body containing space; and
   an oil pan mounted to a peripheral edge of the enclosing wall, wherein a height h of the enclosing wall is greater than a thickness v of the lower valve body.

9. The automatic transmission case as claimed in claim 8, further comprising a longitudinal rib projecting outwardly from the transmission casing and extending parallel to a longitudinal axis of the transmission casing.

10. The automatic transmission case as claimed in claim 9, wherein the longitudinal rib projects diametrically opposite the enclosing wall.

11. The automatic transmission case as claimed in claim 8, further comprising a radially inwardly extending wall at a first end having an opening through which an output shaft passes.

12. The automatic transmission case according to claim 11, wherein a plurality of reinforcing ribs extend between a boss defining the opening for the output shaft and a portion of the transmission casing.

13. The automatic transmission case according to claim 12, wherein the radially inwardly extending wall has an extended portion adjacent an end wall of the enclosing wall and further comprising a second plurality of reinforcing ribs extending from the extended portion between a second portion of the transmission casing and a partial wall substantially coaxial to the boss and extending longitudinally from the radially inwardly extending wall.

14. The automatic transmission case according to claim 13, further comprising a plurality of rear connection ribs extending from the end wall of the enclosing wall to an outer surface of the transmission casing.

15. The automatic transmission case according to claim 8, further comprising a housing mounted to a second end of the transmission casing.

16. The automatic transmission case according to claim 15, further comprising a plurality of joining ribs extending between an outer surface of the housing to a joining wall of the housing, wherein the joining wall is mounted to an opposite end wall of the enclosing wall.

* * * * *